United States Patent [19]
Griffith

[11] 4,254,458
[45] Mar. 3, 1981

[54] INVERTER SYSTEMS

[75] Inventor: Phillip A. Griffith, Goleta, Calif.

[73] Assignee: Santa Barbara Avionics, Inc., Goleta, Calif.

[21] Appl. No.: 3,219

[22] Filed: Jan. 15, 1979

[51] Int. Cl.³ .............................................. H02M 7/00
[52] U.S. Cl. ..................................... 363/13; 323/209; 363/133
[58] Field of Search .......... 323/114, 124, 128, 43.5 R, 323/43.5 S, 60, 109, 110; 363/90, 131, 133, 134, 135, 139, 13

[56] References Cited

U.S. PATENT DOCUMENTS

| | | | |
|---|---|---|---|
| 1,992,809 | 2/1935 | Blume | 323/43.5 R |
| 2,546,725 | 3/1951 | Crary | 323/43.5 R |
| 2,595,869 | 5/1952 | Minneci | 323/110 |
| 3,412,317 | 11/1968 | Williamson et al. | 323/43.5 R |
| 3,495,156 | 2/1970 | Hamilton et al. | 363/133 |

*Primary Examiner*—William M. Shoop
*Attorney, Agent, or Firm*—Lyon & Lyon

[57] ABSTRACT

A DC to AC power inverter for transforming a DC voltage to an AC voltage, and supplying the AC voltage through a transformer to a load, wherein the transformer is provided with a number of taps to permit connection of a capacitor through switch means to a selected tap thereby to improve matching the load impedance with the inverter to improve efficiency by virtue of improving power factor.

3 Claims, 1 Drawing Figure

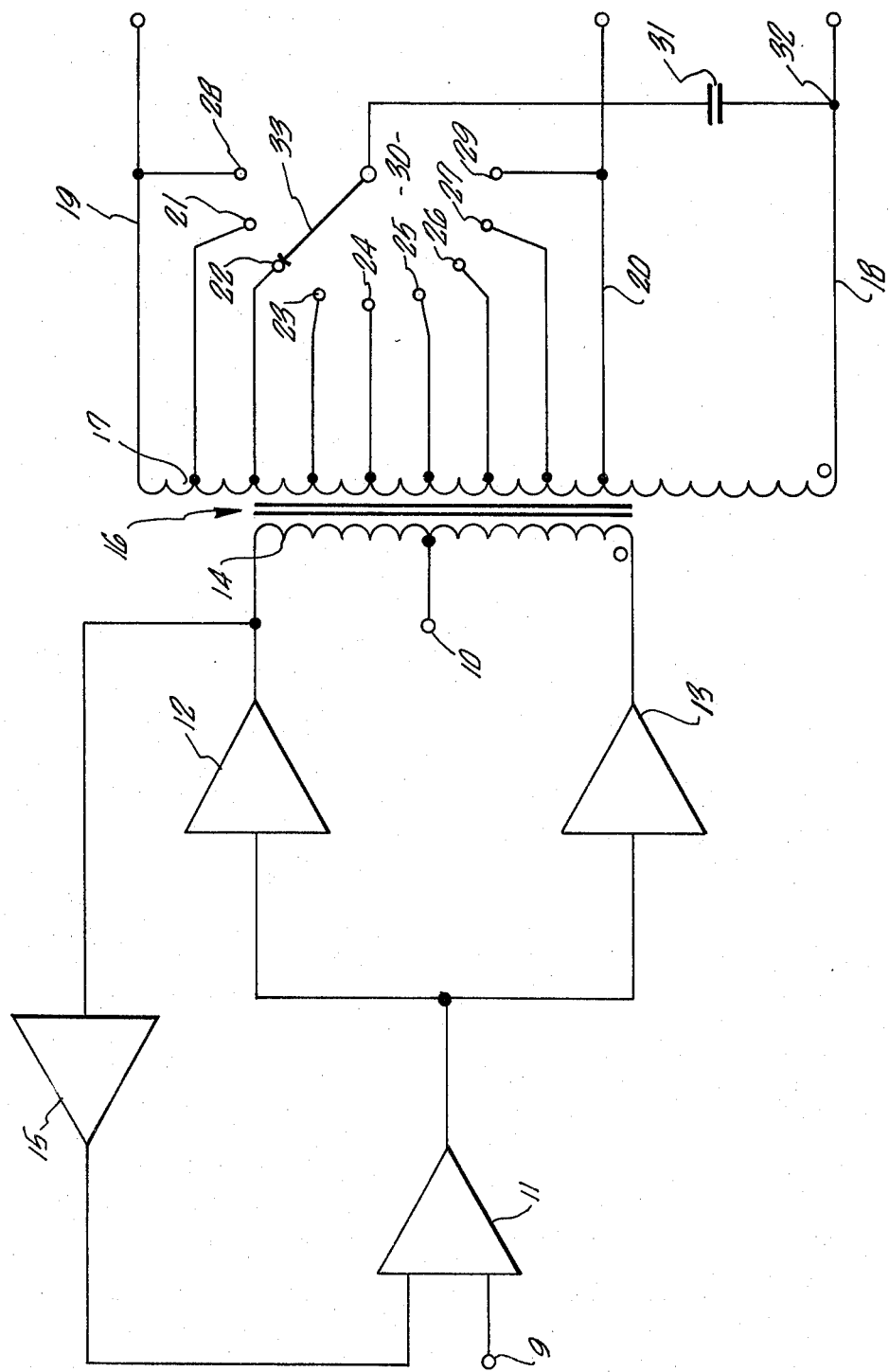

INVERTER SYSTEMS

FIELD OF INVENTION

This invention relates to inverters. In particular it relates to DC to AC power inversion and load matching with the inverter to effect efficient power conversion.

BACKGROUND OF THE INVENTION

Power conversion through DC to AC inverters has conventionally been achieved without concern for having the inverter itself match itself with the load, which is conventionally inductive. A mismatch affects the power factor and hence efficiency of power conversion and consequently more input power is drawn than is in fact needed. In practice, therefore, where there is only a limited supply of input power and/or where conversion efficiency should be optimized, less than efficient conversion will result.

While it has been appreciated that input power should be minimized and the power conversion system rendered more efficient by means of load matching, no means nor method for effecting this in any suitable manner has been provided within inverters. Load matching has been effected by selecting a number of capacitors external to the inverter and experimenting in tuning the circuit for power reduction. This requires the installer physically to connect and disconnect different capacitors until the best possible tuning is achieved. In practice this laborious task is invariably ignored or is dangerous because of the parameters of the inverter, the load and the environment of the circuitry.

In the publication *Flite-Tronics* published Nov. 1, 1977, on page 206, there is shown circuitry wherein a bank of capacitors is connected in parallel across the secondary winding of a transformer. These capacitors, however, do not serve the purpose of load matching but rather convert the square wave output existent across the secondary of the transformer into a sine wave, the initial transformation across the transformer of a square wave providing more efficient power transformation than if a sine wave were fed to the transformer primary. This common practice is known as "Brute Force Wave Shaping." Devices of this nature use a large capacitor merely for wave shaping.

SUMMARY OF THE INVENTION

According to the invention there is provided a DC to AC power inverter including input means for receiving a DC voltage, means for inverting the DC voltage to an AC voltage, and a transformer having primary and secondary windings. The AC voltage on the primary winding is transformed to a different AC voltage at the secondary winding which has output leads connectable to the load. The transformer secondary windings have a number of taps or terminals for selecting different voltages, and a switch is provided for connection with different ones of these terminals and a capacitor which is connected between the switch and one lead from the secondary winding. The selected terminal, and thus the chosen voltage across the capacitor, acts with the capacitor, inductance of the transformer and load impedance to match the load impedance and correct the power factor of the system. The addition of capacitance via the switch and taps essentially acts as if numerous different values of capacitance are available for the output of the inverter. The invention also includes within its scope a method of accomplishing the foregoing.

BRIEF DESCRIPTION OF THE DRAWINGS

The invention is now further described with reference to the attached drawing which is a schematic of a power inverter circuit in accordance with the invention.

DETAILED DESCRIPTION

Although not intending to be limited thereby, an embodiment of the invention of the present application will be described for aircraft use. A DC to AC power inverter includes a circuit for inverting a DC input voltage applied across terminals 9 and 10 to an AC voltage. This circuit comprises an oscillator 11 which operates at 400 Hz and which is fed with a DC voltage from an aircraft generator having a value in the range of, for example, 10 to 16 volts or 22 to 30 volts. The output of the oscillator 11 is connected with two amplifiers 12 and 13 which are connected in a push-pull relationship with a primary winding 14 of a transformer 16. A feedback circuit with a gain element 15 is connected between the output of amplifier 12 and an input of the oscillator 11. This portion of the circuit of the drawing is essentially conventional.

The oscillator 11 and gain element 15 may be a National Semiconductor type LM2900N, and the amplifiers 12 and 13 may each be Motorola type 2N5686, 2N3055 or TIP41C. These elements may be other suitable semiconductors from any other manufacturer, and the amplifiers can also be VFET or Darlington circuits.

The transformer 16 has a secondary winding 17 providing a common lead 18, a high voltage AC lead 19, and also a low voltage AC lead 20. Secondary winding 17 also is provided with taps 21-27 from which other different voltages may be tapped in the following order: terminal 21—103 volts; terminal 22—92 volts; terminal 23—81 volts; terminal 24—76 volts; terminal 25—59 volts; terminal 26—48 volts; and terminal 26—37 volts. These taps are used to supply different voltages to a capacitor 31 as will be explained below. The load or loads (not shown) are connected between the common lead 18 and either or both of leads 19 and 20. The transformer 16 is a Model MP 873 400 hertz power transformer from Magnetic Products, Inc., but which has been modified to include the taps 21-27. The primary is a 32 volt center tapped winding and the common lead 18 provides with lead 19 115 volts at 100 watts or with lead 20 26 volts at 100 watts.

A switch 30 has a terminal connected with one end of the capacitor 31 and the other end of the capacitor is connected to the common lead 18 at a terminal 32. The switch 30 has a movable arm 33 which can connect with any one of the terminals 21 through 29 as required and in this fashion the desired voltage is selected and applied across the capacitor 31. Typically, the capacitor 31 is a polycarbonate capacitor but any other suitable capacitor can be used. The magnitude of the capacitance in the exemplary circuit shown and described is of the order of one microfarad.

The load to the inverter is connected to leads 18 and 19, and/or 18 and 20 and in most typical situations the load is inductive. In aircraft applications, the load includes a synchro or a gyrocompass and the effect of such an inductive load causes the current and voltage to be out of phase and also causes heat to be generated and excessive power to be drawn from the DC source. By coupling the capacitor 31 into circuit in the manner to be described these effects are minimized since the power factor is substantially improved. With the circuit as shown, a single value of capacitance can act as a number of different values by connecting the capacitor 31 to a selected tap 21 through 29.

The procedure for adjusting the circuit is first to connect a load to leads 18 and 19, and/or 18 and 20 and then to measure the input power to the transformer tap 10 or power representative point. The capacitor 31, through switch 30, is then connected to one of the terminals 21 through 29 so that a particular voltage is placed across capacitor 31. Switch 30 then is rotated so that contact is made with different terminals 21 through 29 and the input power is measured for each terminal connection, and the switch 30 is left with a terminal connection such that the input power is minimized. At this point capacitor 31, transformer 16 and the load are at the best match and power consumption is minimized.

With this form of load matching, namely, varying the voltage across capacitor 31 an improved inverter is provided in comparison to usual inverters with which numerous different capacitors are sometimes connected in an attempt to effect load matching. Further the inverter is comparatively simple to load-match, particularly where varying load conditions invariably arise. The inverter of the invention effectively provides an inverter where it appears that many capacitors are available for selection but in fact only one is necessary. A single switch, capacitor and tapped terminals replace this multitude of components.

The present embodiments of this invention are to be considered in all respects as illustrative and not restrictive, the scope of the invention being indicated by the appended claims rather than by the foregoing description, and all changes which come within the meaning and range of equivalency of the claims therefor are intended to be embraced therein. For instance, the input power to the transformer 16 may be measured at a power representative point other than central tap 10. This may be effected by inserting a resistor in the DC line, from which power can be determined. Further, instead of the push-pull invertor circuit described, other inverters, such as bridge inverters may be used.

I claim:

1. A DC to single phase AC power inverter for an aircraft including input means for receiving a DC voltage, circuit means for inverting the DC voltage to an AC voltage at a frequency of substantially 400 Hertz, such circuit means including an oscillator connected to amplifier means and a feedback circuit between the amplifier output and oscillator input, a transformer having primary and secondary windings, the AC voltage being fed from the amplifier means to the the primary winding and the primary winding forming part of the inverting circuit, at least three output leads from the secondary winding forming two outputs and adapted to connect the secondary winding to a load, two of the leads being at the extremities of the secondary winding and the third lead tapping the secondary winding intermediately, and one of the leads forming a common lead, terminals from between the extremities of the secondary winding for tapping different voltages, switch means for connection with different terminals on the secondary winding and a capacitor connected between the switch means and one of the leads from the secondary winding of the transformer, the switch means connecting with a chosen terminal whereby the voltage across the capacitor, the capacitance of the capacitor, and the load impedance substantially match thereby to improve the power factor of the inverter.

2. A method of inverting DC to single phase AC power in an aircraft, including the steps of providing a DC voltage input of less than 30 volts, inverting the DC voltage to an AC voltage at a frequency of substantially 400 Hertz, transforming the AC voltage with a transformer having a primary winding and a secondary winding, leading such transformed voltage to a high voltage compass load and a low voltage inductive load, providing a capacitor for parallel connection across a portion of the secondary winding of the transformer winding through switch means, tapping a portion of the transformer voltage in the secondary winding through the switch means, selecting a tapped portion of the secondary winding and directly connecting the capacitor across such tapped portion whereby the capacitance and load impedance improve the power factor of the inverter, measuring the input power, and setting the switch means to tap that portion of the voltage of the secondary winding substantially to minimize the input power by matching the impedance of the loads with the capacitance.

3. A DC to single phase AC power inverter for an aircraft including input means for receiving a DC voltage of less than 30 volts, circuit means for inverting the DC voltage to an AC voltage at a frequency of substantially 400 Hertz, such circuit including an oscillator connected to amplifiers in push-pull relationship with the primary winding of a transformer, the primary winding being center tapped, and a feedback circuit between the amplifier output and oscillator input, the secondary winding of the transformer having therefrom a high voltage lead connected to one extremity of the secondary winding, a low voltage lead connected intermediate the extremities of the secondary winding and a common lead connected to the other extremity of the secondary winding, all the leads being directly connected with the secondary winding and being adapted for connection to loads, the high voltage lead and the common lead being a first output at a voltage in the range of 120 volts and the low voltage lead and the common lead being a second output at a voltage in the range of 26 volts, at least five taps on the secondary winding between the low voltage lead and the high voltage lead connectable with switch means such that different taps of the secondary may be connected with the switch means, a capacitor directly connected between the switch and the common lead, the switch being adapted to selectively tap the secondary winding of the transformer to place selected voltages across the capacitor to improve matching of the load impedance with the inverter and thereby improve the power factor.

* * * * *